United States Patent [19]

Baek et al.

[11] Patent Number: 5,109,460
[45] Date of Patent: Apr. 28, 1992

[54] OPTICAL FIBER ARRAY FOR A THERMAL PRINTER AND METHOD OF MAKING SAME

[75] Inventors: Seung-Ho Baek, Pittsford; John R. Debesis, Penfield; Mark D. Evans, Hamlin; Daniel A. Rehberg, Webster; Jefferey P. Serbicki, Holley, all of N.Y.

[73] Assignee: Eastman Kodak Company, Rochester, N.Y.

[21] Appl. No.: 749,021

[22] Filed: Aug. 23, 1991

[51] Int. Cl.⁵ .................. G02B 6/04; G03B 27/00; B24B 1/00; C03C 19/00

[52] U.S. Cl. ................. 385/115; 385/116; 385/120; 385/137; 355/1; 156/163; 156/101; 51/283 R; 65/61

[58] Field of Search .......... 350/96.10, 96.20, 96.22, 350/96.24, 96.25, 96.27, 320; 355/1; 156/101, 102, 158, 163, 166; 51/283 E, 283 R; 65/4.3, 61, 174

[56] References Cited

U.S. PATENT DOCUMENTS

| | | | |
|---|---|---|---|
| 4,279,468 | 7/1981 | Turley et al. | 350/96.21 |
| 4,564,866 | 1/1986 | Comberg | 350/96.25 X |
| 4,598,975 | 7/1986 | Bussard et al. | 350/96.24 |
| 4,897,671 | 1/1990 | Mahapatra et al. | 350/96.11 X |
| 4,911,526 | 3/1990 | Hsu et al. | 350/96.24 |
| 4,921,316 | 5/1990 | Fantone et al. | 350/96.27 |
| 4,923,275 | 5/1990 | Kaukeinen | 350/96.24 |
| 4,991,930 | 2/1991 | Baek et al. | 350/96.24 |
| 5,009,475 | 4/1991 | Knudson | 350/96.25 X |
| 5,015,066 | 5/1991 | Cressman | 350/96.27 |
| 5,024,505 | 6/1991 | Junji et al. | 350/96.22 |

FOREIGN PATENT DOCUMENTS 54-23552  2/1979  Japan .................. 350/96.25 X

Primary Examiner—Brian Healy

[57] ABSTRACT

An optical fiber array is disclosed that is useful in a print head of a thermal printer. The array is comprised of materials that hold a collection of output ends of optical fibers in precise alignment to each other and to a well defined plane. The materials of the array are selected so that each material has a polishing rate that is substantially the same. This selection of materials facilitates efficient fabrication of the arrays. Additionally, a fixture that facilitates ease of assembly and finishing of the array is disclosed.

14 Claims, 5 Drawing Sheets

OPTICAL FIBER ARRAY FOR A THERMAL PRINTER AND METHOD OF MAKING SAME

FIELD OF THE INVENTION

The invention relates to an optical fiber array for a thermal printer print head and to a method of making the array.

BACKGROUND OF THE INVENTION

In the field of thermal printing, it has been found desirable to transfer energy to a dye donor from a laser through an optical fiber. Additionally, it has been found desirable to use a plurality of lasers and optical fibers to generate an image with a plurality of simultaneously produced dots. A thermal printer that operated in this mode is described in U.S. Patent Application Ser. No. 451,655, entitled "Thermal Printer", filed Dec. 18, 1989, pending. This application has a common assignee with the present application.

When operating a thermal printer such as the one described above, it is necessary to accurately focus light from output ends of the optical fibers onto a dye honor. In order to facilitate this focusing, it is desirable to have all of the output ends of the optical fibers in a single and well defined plane.

Additionally, it is important that each of the output ends of the optical fibers is accurately spaced a well defined distance from adjacent output ends. When the spacing of the output ends is well defined, the thermal printer can accurately produce images with high resolution. This is because image data can be reliably assigned to particular optical fibers for transfer to a particular area of a receiver of the image.

In one version of the thermal printer described above, an image is produced with a resolution of 1800 dots per inch. The image is generated in a series of multi-line swaths with a separate optical fiber transferring energy for each of the lines during printing. Each of the swaths may contain as many as twenty print lines. Therefore a print head for the printer must contain as many as twenty output ends of optical fibers. Each output end must be positioned extremely close to the adjacent output end. Without extremely close positioning, a resolution of 1800 dots per inch would not be attainable.

Assembly of a print head with such a closely spaced array of optical fibers has heretofore been possible only with time consuming manual techniques that have required an inordinate amount of specialized adjustments and a great deal of trial and error. Prior art print heads have not been suitable for inclusion in a printer that is intended for low cost applications. These print heads have been too expensive and unreliable for application in printers that are to be manufactured and sold for use in typical office settings.

It is desirable therefore to provide a print head with an optical fiber array that is easy to assemble and which has a plurality of output ends of optical fibers positioned in a well defined spatial relationship to one another.

SUMMARY OF THE INVENTION

The present invention is directed to an optical fiber array that is useful in a print head of a thermal printer. The array is comprised of materials that hold a collection of output ends of optical fibers in precise alignment to each other and to a well defined plane. The materials of the array are selected so that each material has a polishing rate that is substantially the same. This selection of materials facilitates efficient fabrication of the arrays.

Viewed from one aspect, the present invention is directed to an optical fiber array for a thermal printer The array comprises a plurality of optical fibers, each having an output end, a support member, a holding member and a bonding material. The support member supports the optical fibers so that the output ends thereof are spaced a predetermined distance from each other. The holding member hold the optical fibers against the support member. The holding member is secured to the support member with a bonding material. The bonding material, the holding member, the support member and the optical fiber have substantially the same finishing rate so that an output end of optical fiber array can be finished and polished into a single plane without damaging the output ends of the optical fibers.

Viewed from another aspect, the present invention is directed to a method of making an optical fiber array for a thermal printer. The method comprises the steps of placing at least one optical fiber onto a support member, positioning a holding member adjacent the support member, placing a plurality of the optical fibers, each having an output end, between the holding member and the support member so that the output ends thereof are spaced a predetermined distance from each other, securing the holding member to the support member with a bonding material, and finishing the output ends of the optical fibers, the support member, the holding member and the bonding material to produce a well defined plane at an output end of the array. The bonding material, the holding member, the support member and the optical fiber have substantially the same finishing rate so that the output end of the array is finished into a single plane without damaging the output ends of the optical fibers.

The invention will be better understood from the detailed description taken in consideration with the accompanying drawings and claims

The drawings are not necessarily to scale.

DETAILED DESCRIPTION

Figure 1:
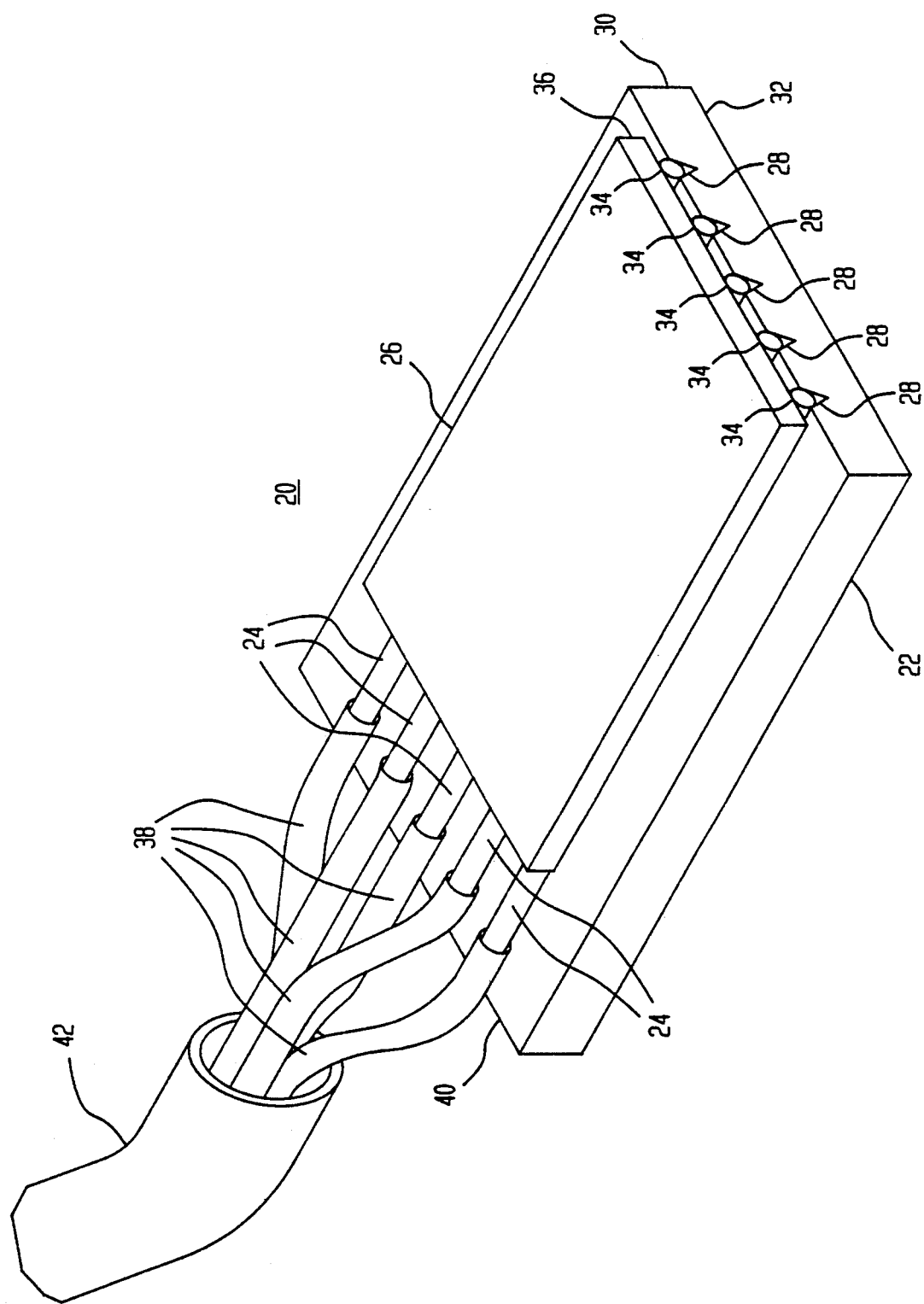
FIG. 1 is a perspective view of an optical fiber array in accordance with the invention.

Referring now to FIG. 1, there is shown a perspective view of an optical fiber array 20 in accordance with a preferred embodiment of the present invention. The array 20 comprises a support member 22, a plurality of optical fibers 24, a holding member 26 and a bonding material (not shown). The optical fibers 24 are supported and positioned in spacer grooves 28 formed in the support member 22. The holding member 26 is adhesively bonded to the support member 22 and the optical fibers 24 with the bonding material.

The array 20 has an output end 30. The array 20 is adapted for installation into a print head (not shown) of a thermal printer (not shown) such as the one described in U.S. Patent Appl. No. 451,655, pending, entitled "Thermal Printer", and described hereinabove. When installed, the output end 30 is positioned next to a focusing lens (not shown).

The support member 22, the optical fibers 24 and the holding member 26 have output ends 32, 34 and 36, respectively. The output ends 32, 34 and 36 are aligned on single plane to form the output end 30 of the array 20.

Each of the optical fibers 24 has a jacket 38 which covers the optical fiber 24 at an input end 40 of the array 20. The optical fibers 24 are collectively held within a protective sheath 42 near the input end 40 of the array 20. One type of optical fiber found suitable in the preferred embodiment is a multimode fiber with step index, N.A. 0.3, Spectran Part No. GO-442-0032 available from Spectran Corp., MA.

The array 20 is shown with only five optical fibers 24 for purposes of clarity. In a typical thermal printing application, the array 20 comprises twelve to twenty optical fibers 24.

Figure 2:
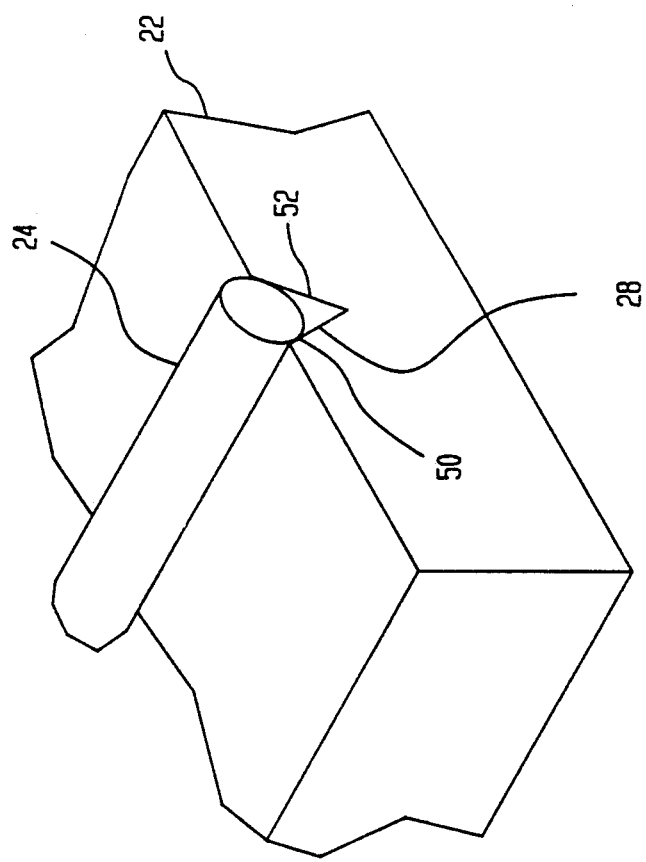
FIG. 2 is view of a portion of the array of FIG. 1 showing a structural detail thereof.

Referring now to FIG. 2, there is shown a single one of the optical fibers 24 of the array 20 of FIG. 1 in one of the grooves 28 of the support member 22. The optical fiber 4 is supported at two positions along its length by surfaces 50 and 52 of the groove 28. The support member 22 is comprised of single crystal silicon. The grooves 28 are formed in the support member 22 by a well known photolithographic technique, for example, the technique described by C. M. Schroeder in an article entitled "Accurate Silicon Spacer Chips for an Optical Fiber Cable Connector," The Bell System Technical Journal, Vol. 57, no. 1 January 1978, pages 91-97. The surfaces 50 and 52 are formed along crystal planes in the silicon of the support member 22. Consequently, their positioning is very precisely controlled. The surfaces 50 and 52 form extremely accurate alignment planes for the optical fiber 24.

Each of the optical fibers 24 is very precisely positioned relative to an adjacent optical fiber if it is securely held in its respective groove 28 with the outer surface of the optical fiber 24 against the surfaces 50 and 52. If, however each optical fiber 24 is not securely held in this manner, the optical array 20 is not capable of accurate high resolution printing.

Figure 3:
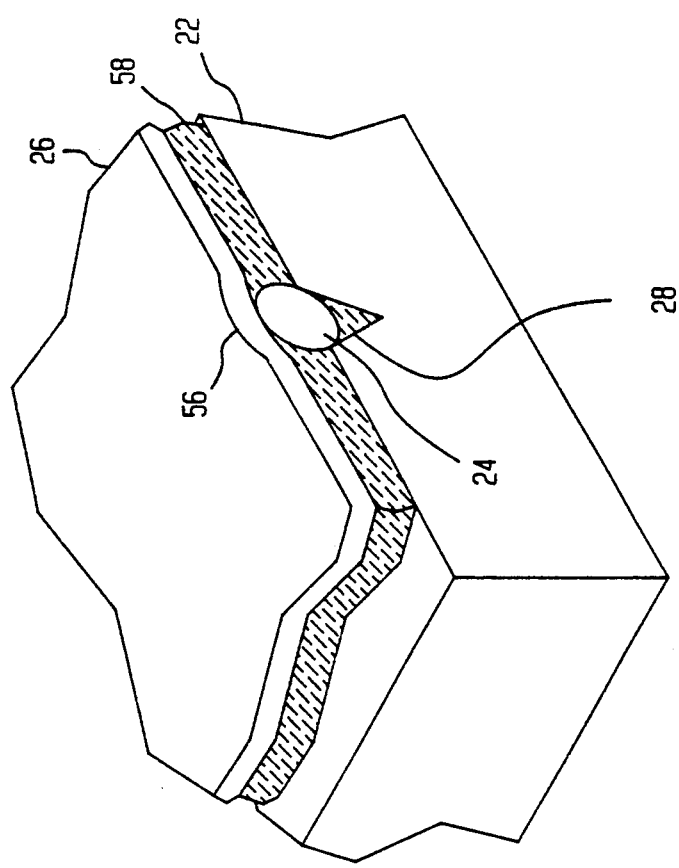
FIG. 3 is a view of a portion of the array of FIG. 1 showing another structural detail thereof.

Referring now to FIG. 3, there is shown a portion of the array of FIG. 1. In particular, one of the optical fibers 24 is shown being held in proper position within its respective groove 28. The holding member 26 is positioned above the optical fiber 24. It can be seen that the holding member 26 is a resilient material which is sufficiently flexible so that its shape partially conforms to the shape of the upper surface of the optical fiber at a point 56. Additionally, it can be seen that the bonding material designated by the number 58 fills the spaces between the holding member 26 and the support member 22 as well as the spaces between the optical fiber 24 and the support member 22.

It has been found that a suitable material for the holding member 26 is a glass fiber and epoxy composite known commercially as FR-4. Inn the particular embodiment described herein, it has been found that FR-4 which is 0.0050 inches thick is a suitable material for the holding member 26. It has been found that a suitable material for the bonding material 58 is an epoxy resin sold under a trademark EPO-TEK 301 by Epoxy Technology, Inc. MA. However, it has been found that the bonding material 58 must be cured with a special cure cycle in order to achieve the desired properties in the array 20. The special cure cycle is described later hereinbelow.

The resiliency of the holding member 26 is important because the bonding material 58 contracts when it cures. The contraction of the bonding material 58 produces bending stresses in the holding member and the support member 22. The support member 22 is particularly intolerant to bending stresses. The etched grooves 28, which are formed along crystal planes, produce a vulnerability for cleavage in the support member 22. In other words, if the support member 22 is subjected to bending forces, it is likely to separate along one or fore of the crystal planes surfaces 50 or 52 (FIG. 2). The resilient holding member 26 acts as a stress distribution element in the array 20. The stresses produced by contraction of the bonding material 58 are absorbed by deflections of the holding member 26. These contraction induced stresses are thus precluded from producing any bending forces in the support member 22.

It has been found the when rigid materials such as glass are employed as a holding member, the support member 22 is likely to separate (cleave). It has been found that when a soft material, such as aluminum, is used as a holding member, it is difficult to finish the output end 30 (FIG. 1) of the array 20 into a single well defined plane (as explained later hereinbelow). Thus it has been found necessary to employ a material that is both hard and resilient for the holding member 26.

The array 20 of FIG. 1 is a small but complex device. The support member in a preferred embodiment is only 21 mm long and 10 mm wide. The optical fibers 24 are spaced on 0.15 mm centers. These small dimensions pose substantial assembly problems. It has been found that a specialized fixture is useful for assembling the arrays 20.

Figure 4:
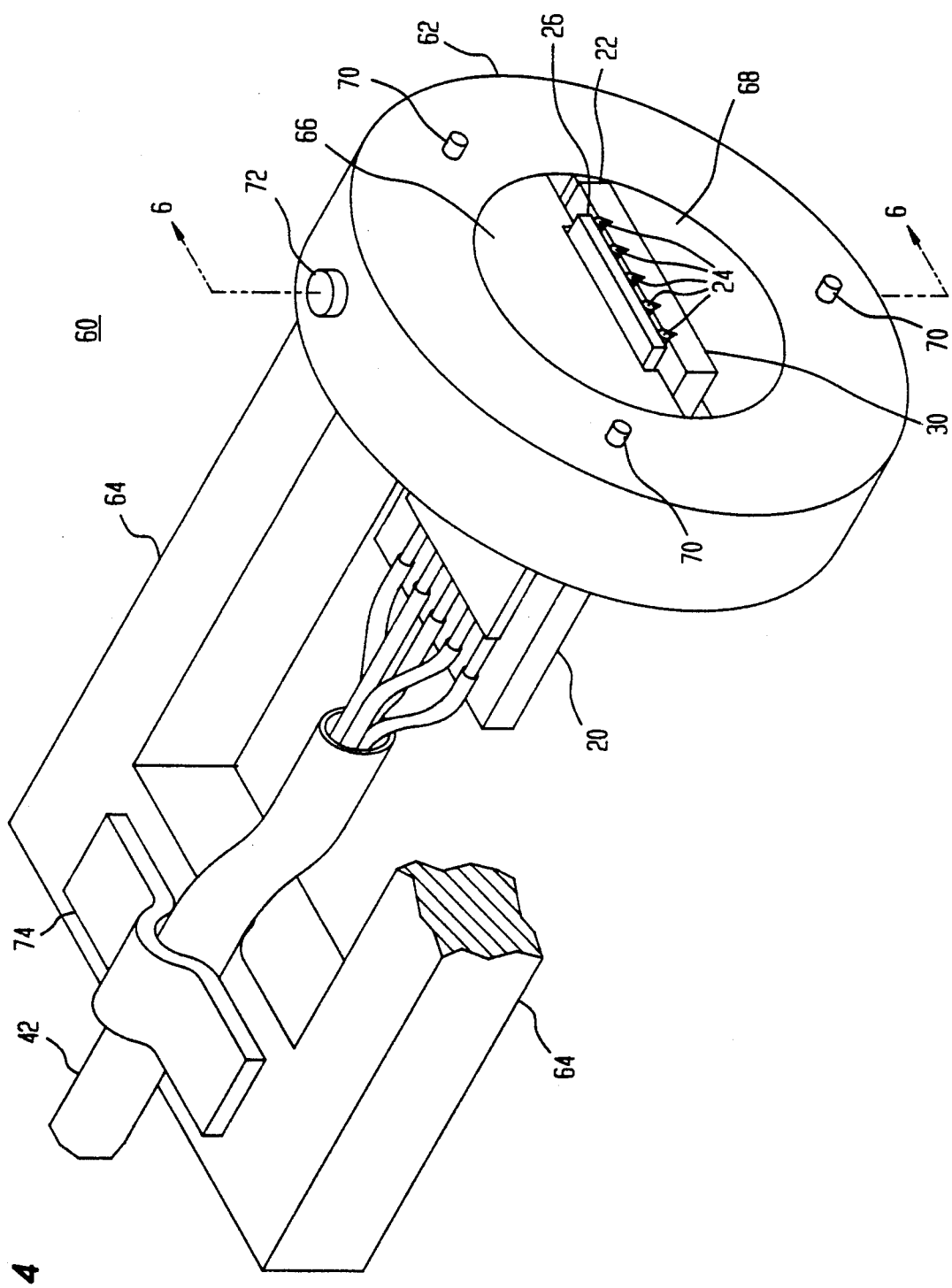
FIG. 4 is a perspective view of a fixture that is useful in assembling the array of FIG. 1.

Referring now to FIG. 4, there is shown a perspective view of a fixture 60 useful for assembling the arrays 20 of FIG. 1. The fixture 60 comprises a ring 62, support arms 64, upper and lower inserts 66 and 68, respectively, three offset screws 70, a clamping screw 72, and a sheath clamp 74. A portion of one of the support arms 64 is shown broken away for purposes of clarity. The inserts 66 and 68 are adapted to hold the support member 22 and the holding member 25 during assembly of the array 20. The inserts 66 and 68 are held in position within the ring 62 by the clamping screw 72. The supports arm 64 is rigidly attached to the ring 62 and supports the sheath 42 and the sheath clamp 74. The offset screws 70 are threaded into the ring 62 and are adjusted to define a plane for finishing the output end 30 of the array 20 after it is assembled.

The operation of the fixture 60 can be better understood by reference to some detailed views of some of its components.

Figure 5:
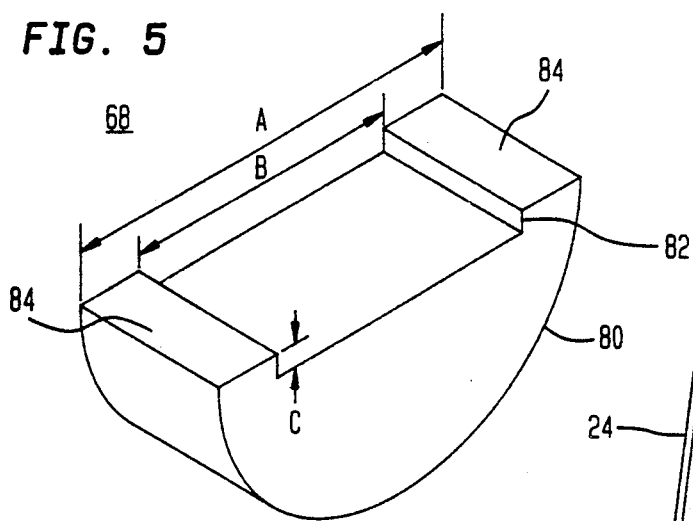
FIG. 5 is a perspective view of an insert used in the fixture of FIG. 4.

Referring now to FIG. 5, there is shown one of the inserts 68. The insert 68 comprises a body 80 which is substantially semi-cylindrical in shape. A portion of the body 80 defines a rectangular slot 82. Two clamping surfaces 84 are adjacent the slot 82. The body 80 has a diametric dimension A that is slightly larger than a width of the support member 22 (FIG. 1). The slot 82 is located symmetrically on the body 80 and has a width, dimension B, that is smaller than the width of the support member 22, but larger than a width of the holding member 26 (FIG. 1). The slot has a depth, dimension C, that is slightly greater than a thickness of the holding member 26. The insert 66 (FIG. 5) is identical with the insert 68.

It can be seen that when the inserts 66 and 68 are inserted into the ring 62 (FIG. 4), the support member is held by the clamping surfaces 84 of both of the inserts 66 and 68. The holding member 26 fits into one of the slots 82. In the case illustrated in FIG. 4, the holding member 26 is shown in the slot 82 of the insert 66. It can be seen that the fixture 60 can also be used to assemble an array with optical fibers on both sides of a support member.

In order to understand the features of the fixture 60, it is useful to consider a sequence of steps which are employed in assembling one of the arrays 20.

Figure 6:
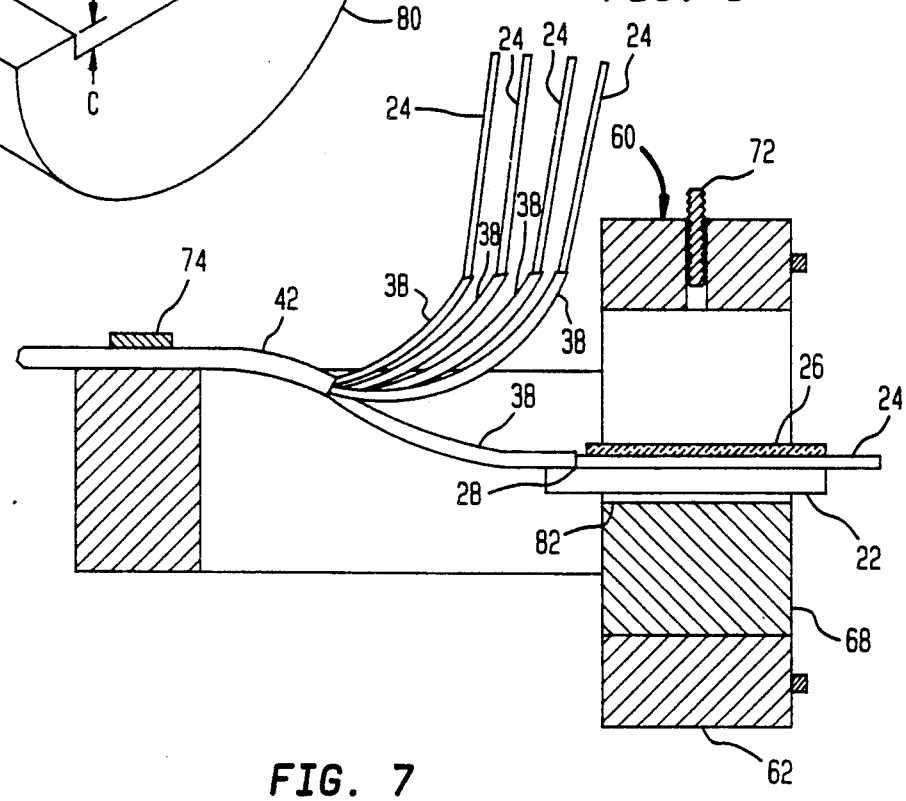
FIG. 6 is a cross sectional view of the fixture of FIG. 4 taken along the line 6—6 of FIG. 4, showing a step in the assembly of the array of FIG. 1.

Referring now to FIG. 6, there is shown sectional view of the fixture 60 taken along the dashed line 6—6 of FIB. 4. FIG. 6 shows an early step in the assembly of the array 20 and thus does not show all of the elements of FIG. 4 in their same relationship. In FIG. 6 the lower insert 68 is in the ring 62. One of the support members 22 is resting on the insert 68. The sheath 42 is held by the clamp 74. One of the optical fibers 24 is inserted in one of the grooves 28 of the support member 22. The remaining optical fibers 24 are left free at the stage of assembly illustrated in FIG. 6. One of the holding members is lying on top of the one optical fiber 24 that is in position in one of the grooves 28.

It should be noted that each of the optical fibers 24 has a portion of its jacket 38 removed from a free end. This permits a core portion of the optical fiber 24 to lie directly in its respective groove 28. Consequently, the optical fibers 24 can be packed together very closely in the array 20 of FIG. 1. If the portions of the jacket 38 were not removed, a desired center to center spacing of fibers would require the use of smaller diameter fibers. This would result in lower energy transmission through each fiber 24 and a consequent lower printing speed.

Figure 7:
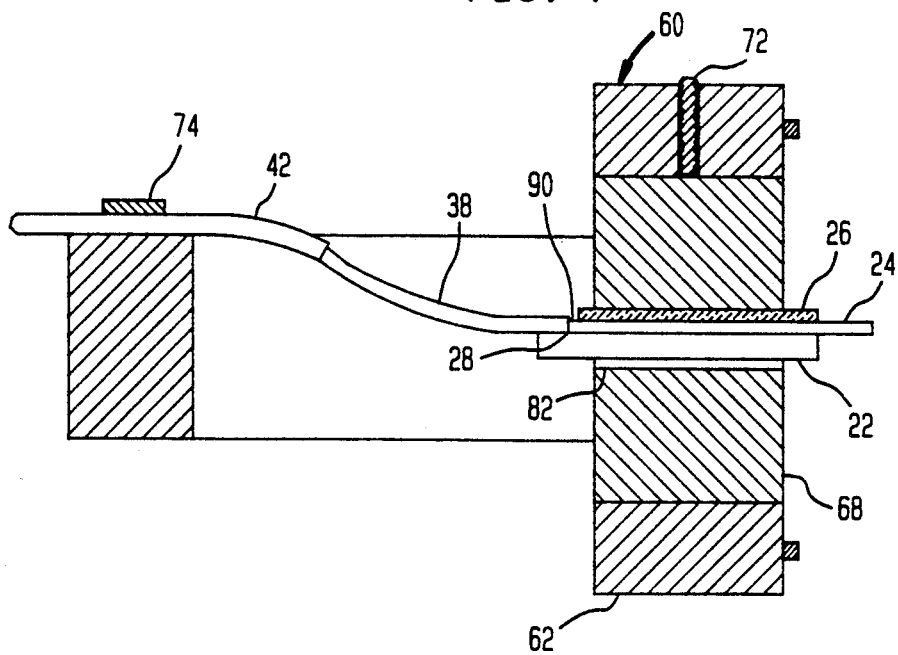
FIG. 7 is a cross sectional view of the fixture of FIG. 4 taken along the line 6—6 of FIG. 4 showing another step in the assembly of the array of FIG. 1.

Referring now to FIG. 7, there are shown virtually the same elements as those described in FIG. 6, but at a later stage of assembly. The insert 66 is shown in position within the ring 62.

In proceeding from the state of assembly shown in FIG. to that shown in FIG. 7, the insert is placed into the ring 62 and clamped with the clamping screw 72. This causes the support member to be firmly held between the inserts 66 and 68. The holding member is held with moderate tightness within the slot 82 of the insert 66.

After the insert 66 is in position, the remaining free optical fibers 24 (FIG. 6) are pushed into their respective grooves 28 from the left to the right side of the ring 62. The optical fibers 24 are inserted so that their respective free ends extend beyond the support member 22 on the right side of the fixture 60 and so that a portion of the jacket 38 rests on the support member 22.

After all of the optical fibers are in position as shown in FIG. 7, the bonding material (not shown) is applied in liquid form to the region generally designated by the numeral 90 in FIG. 7. The liquid bonding material has a sufficiently low viscosity so that it is wicked into the interstices between the optical fibers 24, the holding member 26, the support member 22 and the grooves 28. Additionally, the liquid bonding medium overcoats the optical fibers 24 in the regions where the jacket 38 has been removed. This assures that the core portion of the optical fiber 24 is not left exposed to possible damage from exposure to the atmosphere.

After the bonding material is applied, it is permitted to cure at room temperature for at least one hour. The room temperature curing raises the viscosity of the bonding material so that subsequent exposure to a higher temperature in a curing cycle does not causes the bonding material to run off of desired locations. After the initial room temperature curing, the entire fixture 60 and the assembled array 20 are exposed to a temperature of 65° C. for at least four hours. A four hour cure at 65° C. is an abnormally long cure for an epoxy bonding material such as the EPO-TEK 301 described hereinabove. However, this inordinately long cure time produces an advantageous hardness in the bonding material which is important in a subsequent finishing operation.

After the bonding material is cured, the array 20 is removed from the fixture 60. The array 20 is clamped in position on a conventional semiconductor saw (not shown). The saw is used to cut a uniform end on the array 20. In other words, free ends of the support member 22, the optical fibers 24 and the holding member 26 are all cut simultaneously to form a substantially uniform plane at the output end 30 of the array 20. The array is replaced in the fixture 60 with the output end 30 projecting to the right beyond the fixture 60.

Figure 8:
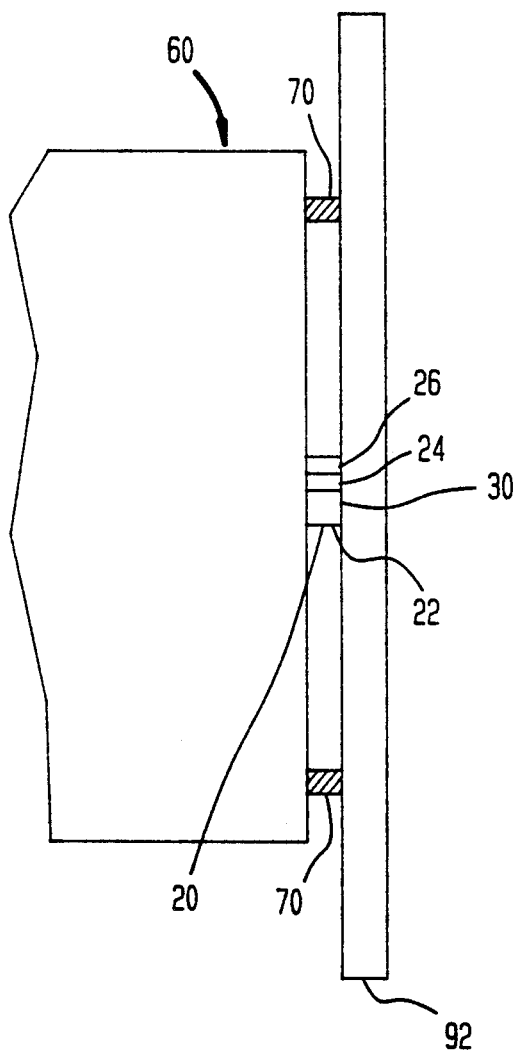
FIG. 8 is view of a portion of the fixture of FIG. 4 showing an operational feature thereof.

Referring now to FIG. 8, there is shown a portion of the fixture 60 of FIG. 4 with a portion of the array 20 projecting therefrom. The array 20 is in the configuration that results from the above described sawing operation. The support member 22, the optical fibers 24, and the holding member 26 are cut to form a substantially single plane at the output end 30. The output end 30 is shown in position against an abrasive polishing medium 92. Two of the offset screws 70 are shown adjusted to provide a planar alignment for the fixture 60 relative to the polishing medium 92.

In operation, the fixture 60 is moved across the polishing medium 92 as the output end 30 of the array 20 is finished into a well-defined single plane. The polishing medium is shown as a single item in FIG. 8, but in fact various grades of abrasives are used in a succession of polishing steps to provide the desired finish on the output end 30. In a preferred embodiment four grades of abrasive are used in succession; twelve micron, nine micron, three micron, and finally one micron.

It is during these polishing steps that the consistency of materials in the array 20 manifests its criticality. It has been found that the FR-4 of the holding member 26 polishes at substantially the same rate as the silicon of the support member 22. Similarly, the highly cured epoxy of the bonding material polishes at substantially the same rate as the holding member 26 and the support member 22. And finally, the glass of the optical fibers 24 polishes at substantially the same rate as all of the above mentioned materials. It should be noted however that the glass of the optical fibers 24 is annealed. It was found necessary to anneal the glass so that its polishing rate would be consistent with the polishing rates of the other materials of the array 20. When unannealed glass is used as the optical fiber 24, there is some undesirable chipping and cracking of the glass during the polishing operation.

If these polishing rates were not substantially equal, it would be virtually impossible to produce a single well defined plane at the output end 30 of the array 20 with sufficient precision to accommodate the transmission of high energy levels needed to perform thermal printing with the thermal printer described hereinabove. For example, if the bonding material polished away more quickly than the glass, the output ends 34 of the optical fibers 24 (FIG. 1) would be left unsupported during the polishing operation. This would result in chipping of the glass.

It has thus been discovered that increasing hardness of the bonding material, decreasing hardness of the glass, and using a hard but resilient holding material, produces a readily manufacturable optical fiber array.

It is to be appreciated and understood that the specific embodiments of the invention are merely illustrative of the general principles of the invention. Various modifications may be made by those skilled in the art which are consistent with the principles set forth. For example, the present invention is useful in thermal printers that operate with arrays having any number of optical fibers.

What is claimed is:

1. An optical fiber array for a thermal printer, the optical fiber array comprising:
    a plurality of optical fibers each having an output end;
    a support member for supporting the optical fibers so that the output ends thereof are spaced a predetermined distance from each other;
    a holding member for holding the optical fibers against the support member;
    the holding member being secured to the support member with a bonding material; and
    the bonding material, the holding member, the support member and the optical fiber having substantially the same finishing rate so that an output end of optical fiber array can be finished into a single plane without substantially damaging the output ends of the optical fibers.

2. The optical fiber array of claim 1 wherein the optical fibers are annealed glass.

3. The optical fiber array of claim 1 wherein the support member is silicon.

4. The optical fiber array of claim 1 wherein the holding member comprises a composite of resin and glass.

5. The optical fiber array of claim 4 therein the bonding material is substantially the same resin as the resin in the holding member.

6. The optical fiber array of claim 4 wherein the resin is epoxy.

7. The optical fiber array of claim 5 wherein the resin is epoxy cured for at least about four hours at a temperature of at least about 65° C.

8. A method of making an optical fiber array for a thermal printer, the method comprising the steps of:
    placing at least one optical fiber onto a support member
    positioning a holding member adjacent the support member;
    placing a plurality of the optical fibers, each having an output end, between the holding member and the support member so that the output ends thereof are spaced a predetermined distance from each other;
    securing the holding member to the support member with a bonding material; and
    finishing the output ends of the optical fibers, the support member, the holding member and the bonding material to produce a well defined plane at an output end of the array, the bonding material, the holding member, the support member and the optical fiber having substantially the same finishing rate so that the output end of the array is finished into a single plane without substantially damaging the output ends of the optical fibers.

9. The method of claim 8 wherein the optical fibers are annealed glass.

10. The method of claim 8 wherein the support member is silicon.

11. The method of claim 8 wherein the holding member comprises a composite of resin and glass.

12. The method of claim 11 wherein the bonding material is substantially the same resin as the resin in the holding member.

13. The method of claim 11 wherein the resin is epoxy.

14. The method of claim 13 which comprises the further step of curing the bonding material for at least about four hours at a temperature of at least about 65° C.

* * * * *